US006635361B1

(12) United States Patent
Sugihara et al.

(10) Patent No.: US 6,635,361 B1
(45) Date of Patent: Oct. 21, 2003

(54) MAGNETIC SHIELDING STEEL SHEET AND METHOD FOR PRODUCING THE SAME

(75) Inventors: Reiko Sugihara, Tokyo (JP); Tatsuhiko Hiratani, Tokyo (JP); Hideki Matsuoka, Tokyo (JP); Yasushi Tanaka, Tokyo (JP); Satoshi Kodama, Tokyo (JP); Kenji Tahara, Tokyo (JP); Yasuyuki Takada, Tokyo (JP); Ken-ichi Mitsuzuka, Tokyo (JP)

(73) Assignees: NKK Corporation, Tokyo (JP); Sony Corporation, Tokyo (JP)

( * ) Notice: Subject to any disclaimer, the term of this patent is extended or adjusted under 35 U.S.C. 154(b) by 0 days.

(21) Appl. No.: 09/806,130

(22) PCT Filed: Aug. 10, 2000

(86) PCT No.: PCT/JP00/05374

§ 371 (c)(1), (2), (4) Date: Mar. 26, 2001

(87) PCT Pub. No.: WO01/12870

PCT Pub. Date: Feb. 22, 2001

(30) Foreign Application Priority Data

Aug. 11, 1999 (JP) .......................................... 11-228006
Feb. 21, 2000 (JP) ...................................... 2000-042098

(51) Int. Cl.[7] ......................... B32B 15/04; B32B 15/08; H01F 1/047; B21B 1/26; B21B 1/28

(52) U.S. Cl. ....................... 428/667; 428/684; 428/332; 428/680; 428/692; 428/693; 29/17.2; 29/17.3; 72/365.2; 72/379.2; 148/100; 420/8

(58) Field of Search ................................ 428/684, 667, 428/680, 681, 212, 215, 220, 332, 692, 693, 900; 420/8, 121, 128; 29/17.1, 17.2, 17.3; 72/364, 365.2, 379.2, 707, 700; 148/100, 101, 112, 122, 240, 559, 579, 622, 625, 661, 660, 662, 320, 405; 313/364, 492

(56) References Cited

U.S. PATENT DOCUMENTS

| | | | | | |
|---|---|---|---|---|---|
| 5,094,920 | A | * | 3/1992 | Shiozaki et al. | 428/472.1 |
| 5,714,017 | A | * | 2/1998 | Tomida et al. | 148/308 |
| 5,871,851 | A | * | 2/1999 | Fukumizu et al. | 428/667 |
| 6,025,673 | A | * | 2/2000 | Ikeda et al. | 313/402 |
| 6,129,992 | A | * | 10/2000 | Sakuma et al. | 428/611 |
| 6,416,594 | B1 | * | 7/2002 | Yamagami et al. | 148/306 |

FOREIGN PATENT DOCUMENTS

| | | | | |
|---|---|---|---|---|
| GB | 2322575 | | * | 9/1998 |
| JP | 3-61330 | A | | 3/1991 |
| JP | 3-146644 | A | | 6/1991 |
| JP | 5-41177 | A | | 2/1993 |
| JP | 6-2906 | A | | 1/1994 |
| JP | 10-168551 | A | | 6/1998 |

OTHER PUBLICATIONS

I. Saitoh, "Magnetic Characteristics of Magnetic Shield in CRT and Their Effect on Landing Drifts Caused by Terrestial Magnetic Field", Institute of Electronics, Information and Communication Engineers, C–II, vol. J79–C–II, No. 6, pp. 311–319 (1996). (no month).

* cited by examiner

*Primary Examiner*—Michael LaVilla
(74) *Attorney, Agent, or Firm*—Frishauf, Holtz, Goodman & Chick, P.C.

(57) ABSTRACT

A steel sheet for magnetic shields is provided containing 0.15% by weight or less of C and having a thickness of 0.05–0.5 mm and an anhysteretic magnetic permeability of 7500 or higher.

28 Claims, No Drawings

MAGNETIC SHIELDING STEEL SHEET AND METHOD FOR PRODUCING THE SAME

This application is the United States national phase application of International Application PCT/JP00/05374 (not published in English) filed Aug. 10, 2000.

TECHNICAL FIELD

The present invention relates to a steel sheet used for a magnetic shielding component which is set inside or outside a color cathode ray tube, encircling the electron path along the electron beam, i.e. a magnetic shielding steel sheet for a color cathode ray tube.

BACKGROUND ART

A basic arrangement of color cathode ray tubes comprises an electron gun for emitting electron beam and a phosphor screen for emitting light to develop an image when scanned by the electron beam. The electron beam may however be undesirably deflected by the effect of geomagnetism, hence causing color deviation in the image. For preventing such deflection, internal magnetic shields (also termed inner shields or inner magnetic shields) are installed. Additionally, external magnetic shields (also termed outer shields or outer magnetic shields) are provided outside the color cathode ray tube, in some cases. For simplicity, those inner magnetic shields and outer magnetic shields are referred to as magnetic shields hereinafter.

Recently, as commercial TV sets have been enlarged or widened in the screen size, the flight path length and scanning length of the electron beam increase significantly and thus TV sets have become more susceptible to the effect of geomagnetism. In other words, a deviation of the landing point on the phosphor screen of the electron beam from the designated point, which is caused by the effect of geomagnetism (thus termed a geomagnetic drift), maybe increased more than ever before. Since higher definition in the still image is requested in a cathode ray tube used for a personal computer display, it is most crucial to reduce such color deviation caused due to the geomagnetic drift.

In this circumstance, steel sheets used for the magnetic shields are often evaluated on the basis of known parameters including the magnetic permeability in a low magnetic filed equivalent substantially to the geomagnetism, the coercive force, and the remanent flux density.

One of technologies for improving the characteristics of steel sheet for magnetic shields is disclosed in Japanese Patent Disclosure (KOKAI) No. 3-61330 where the ferrite grain size number in a specific composition steel is defined to not larger than 3.0 to improve the magnetic properties. It is also described in the same disclosure that the required magnetic permeability of not less than 750 G/Oe and the required coercive force of not more than 1.25 Oe are mentioned as examples of preferable magnetic properties for a cold-rolled steel sheet for magnetic shields.

Alternatively, disclosed in Japanese Patent Disclosure (KOKAI) No. 5-41177 is a technique for producing an inner magnetic shield using of a magnetic material of which the remanent flux density is not less than 8 kG.

In Japanese Patent Disclosure (KOKAI) No. 10-168551, an improved magnetic shielding material which is used a specific composition steel of which the grain size of the product is kept small and having the coercive force of not less than 3 Oe and remanent flux density of not less than 9 kG, and a manufacturing method thereof are disclosed.

As those conventional technologies are unsatisfactory in the magnetic shielding effect, they may hardly overcome degradation in the image quality caused by color deviation pertinent to advanced commercial TV sets with the enlarged and/or widened screens. It is highly desired to provide improved steel sheets for magnetic shielding which have a higher level of the magnetic shielding effect.

In an article, Transaction (in Japanese) of the Institute of Electronics, Information, and Communication Engineers, vol. J79-C-II No. 6, p. 311–319, June 1996, the relationship between anhysteretic magnetic permeability and magnetic shielding effect is described, and it is pointed out that the higher the anhysteretic magnetic permeability is, the higher the magnetic shielding effect becomes.

The article, however, only describes the relationship between anhysteretic magnetic permeability and magnetic shielding effect, and it fails to disclose which type of steel sheet has a higher level of the anhysteretic magnetic permeability.

DISCLOSURE OF THE INVENTION

The present invention has been carried out in view of the above circumstances. Its object is to provide a steel sheet for magnetic shields which has a higher level of the anhysteretic magnetic permeability and is capable of decreasing the color deviation caused by geomagnetic drift to yield an image of higher definition, and a manufacturing method thereof.

According to an aspect of the present invention, there is provided a steel sheet for magnetic fielding containing 0.15% by weight or less of C and having a thickness of 0.05–0.5 mm and an anhysteresis magnetic permeability of 7500 or higher.

According to another aspect of the present invention, there is provided a steel sheet for magnetic shielding consisting essentially of 0.005–0.025% by weight of C, less than 0.3% by weight of Si, 1.5% by weight or less of Mn, 0.05% by weight or less of P, 0.04% by weight or less of S, 0.1% by weight or less of Sol.Al, 0.01% by weight or less of N, 0.0003–0.01% by weight of B, and the balance of Fe, wherein the thickness ranges 0.05–0.5 mm, a coercive force is less than 3.0 Oe, and an anhysteresis magnetic permeability is 8500 or higher.

According to further aspect of the present invention, there is provided a method of producing a magnetic shielding steel sheet comprising the steps of: hot-rolling a steel slab containing 0.15% by weight or less of C and then cold-rolling the hot-rolled steel sheet; annealing the cold-rolled steel sheet; and skin-pass rolling the steel sheet at a reduction of 1.5% or less, if necessary.

According to still further aspect of the present invention, there is provided a method of producing a magnetic shielding steel sheet comprising the steps of: hot-rolling a steel slab, which contains 0.005–0.025% by weight of C, less than 0.3% by weight of Si, 1.5% by weight or less of Mn, 0.05% by weight or less of P, 0.04% by weight or less of S, 0.1% by weight or less of Sol.Al, 0.01% by weight or less of N, 0.0003–0.01% by weight of B, directly or after a re-heating process, at a finishing temperature higher than the transformation temperature of Ar3; coiling the hot-rolled steel sheet at a temperature of 700° C. or lower; pickling the coiled hot-rolled steel sheet; cold-rolling the pickled hot-rolled steel at a reduction of 70–94%; and continuously annealing the cold-rolled steel sheet at a temperature in the range of 600–780° C.

BEST MODE FOR CARRYING OUT THE INVENTION

The present invention will now be described in more detail.

In general, in a color cathode ray tube, demagnetization is carried out for adjusting the effect of external magnetic field to a constant condition under the operating circumstance. Such demagnetization is generally implemented by a method of applying an alternating current to the demagnetizing coils mounted outside the cathode ray tube when the TV set is switched on or in other opportunities. The method permits the demagnetization process in the geomagnetism, whereby the magnetic shields in the cathode ray tube can remain more highly magnetized than those perfectly demagnetized followed by magnetization by the geomagnetism. This allows the magnetic shields to have a higher level of the shielding effect than the condition of firstly perfectly demagnetized and successively magnetized by the geomagnetism. Accordingly, as described in the article, Transaction (in Japanese) of the Institute of Electronics, Information, and Communication Engineers, vol. J79-C-II No. 6, p. 311–319, June 1996, the steel sheet suitable for magnetic shielding is the steel sheet having high "anhysteretic magnetic permeability" which is determined by dividing remanent flux density after the demagnetization process in the geomagnetism, by geomagnetic field. In view of the above aspects, the inventors have examined the anhysteretic magnetic permeability at DC bias magnetic field of 0.35 Oe over a variety of steel sheets which have various chemical compositions.

As a result, our findings are:

i) ultra low carbon steel which have relatively high magnetic permeability at the low magnetic field (for example, of 0.35 Oe; the magnetic permeability denotes $\mu 0.35$ hereinafter), one of the parameters used for evaluation, and often used as the magnetic shields do not always exhibit a higher level of the anhysteretic magnetic permeability;

ii) even relatively high carbon steels (C of 0.005–0.15%, preferably 0.005–0.06, and more preferably 0.005–0.025% by weight), which were very rarely utilized formerly, can exhibit a higher level of the anhysteretic magnetic permeability when they contain cementite ($Fe_3C$);

iii) Using a steel sheet having the anhysteretic magnetic permeability of 7500 or higher, preferably 8500 or higher, for the magnetic shield, color deviation can be satisfactorily reduced to practically negligible level; and iv) increase of C content leads to an increase in the coercive force and in this case the demagnetization might be imperfectly carried out depending on the demagnetizing conditions (the magnitude of a demagnetizing current, the demagnetizing amplitude, etc.). In such cases, even if the steel sheet has sufficiently high anhysteretic magnetic permeability, magnetization after degaussing process is insufficient and attenuation of color deviation is difficult. It is also found that the coercive force should not exceed 5.5 Oe and it is preferably less than 3.0 Oe for allowing general degaussing process to achieve a satisfactory demagnetization treatment.

The inventors have developed the present invention through a series of further studies based on the foregoing findings.

A first embodiment of the present invention is explained. A steel sheet for magnetic shields according to the first embodiment of the present invention contains 0.15% by weight or less of C and has a thickness of 0.05–0.5 mm and the anhysteretic magnetic permeability of 7500 or higher.

The composition of the steel preferably contains B of 0.0003–0.1% by weight and more preferably contains one or more elements selected from a group of Ti, Nb, and V, the total amount of which is 0.08% by weight or less. Also, the surface of the steel sheet is preferably coated with a Cr plating layer and/or an Ni plating layer. Moreover, its coercive force is preferably 5.5 Oe or smaller.

The chemical composition, thickness, anhysteretic magnetic permeability, plating, and coercive force of the steel sheet are explained below in more detail.

1. Chemical Composition of the Steel

C: C is an element the content of which is the most important in the present invention. It is generally said that C is a harmful element for the magnetic shielding steel sheet, because it leads to the decrease in $\mu 0.35$. It is now proved from the result of our studies that C has less harmful influence to the anhysteretic magnetic permeability. However, if the amount of C is too high, the coercive force will then increase and limit the conditions of demagnetization for ensuring the anhysteretic magnetic permeability. For this reason, C content is 0.15% by weight or less and preferably 0.06% by weight or less. While considering the other properties, the steel may be annealed for decarburization after the hot- or cold-rolling process to lower the C content to less than 0.0005% by weight. Considering cost of steelmaking, however, it is preferable that C content is limited to 0.0005% by weight or higher.

B: B is an effective element in increasing the anhysteretic magnetic permeability and its addition is preferable. The optimum effect of increasing the anhysteretic magnetic permeability may be given when B content is 0.0003% by weight or more. If B content exceeds 0.01% by weight, the effect of increasing the anhysteretic magnetic permeability may not only be saturated but also the recrystallization temperature may rise or the hardness of the steel may increase too much. Thus, the preferable B content is determined as 0.0003–0.01% by weight, if added.

Ti, Nb, and V: These elements tend to form carbides, nitrides, and/or carbonitrides. When the aging property is important, preferably they are added for avoiding the stretcher-strain marks. If the amount is too high, the recrystallization temperature may rise up or the hardness of the steel may increase too much. The total amount of one or more elements is preferably 0.08% by weight or less. For yielding a steel sheet having a very high level of the anhysteretic magnetic permeability, those elements is preferably added in combination with B.

2. Thickness

If the steel sheet used as a magnetic shield is too thin, its magnetic shielding effect may be declined even using a steel sheet with higher anhysteretic magnetic permeability and also its rigidity may be lowered. Therefore, the thickness is 0.05 mm or larger. From the viewpoint of increasing the magnetic shielding effect, the thicker steel sheet is preferable. However, as it is desired to minimize the overall weight of the color TV sets whose screen sizes are becoming larger and wider, the thickness is 0.5 mm or smaller.

3. Anhysteretic Magnetic Permeability

The anhysteretic magnetic permeability of the magnetic shield material is an effective parameter which is strongly related to the color deviation on a color cathode ray tube. The magnetic shield material having the anhysteretic magnetic permeability of 7500 or higher can reduce the color deviation to a level which is hardly noticeable in practice, even for a color cathode ray tube of large screen size or high-definition type. Accordingly, the anhysteretic magnetic permeability is limited to 7500 or higher in this embodiment.

4. Plating

The Cr plating layer and/or the Ni plating layer is desired for anticorrosion property. The plating layer structure may be a single layer or a multi-layer structure. The plating may be provided on either one side or both sides of the steel sheet. The plating layer is effective not only for anticorrosion property but also for preventing the generation of degassing in the steel sheet of the cathode ray tube. The total amount of the plating layer is not necessary to be limited and may arbitrarily be determined so that it can cover all over the surface(s) of the steel sheet. Also, the plating may be implemented by partially plating with Ni and then finishing with chromate treatment.

5. Coercive Force

If the coercive force is excessively high, it is necessary to increase the demagnetizing current and the demagnetizing amplitude for ensuring the magnetic shielding effect, which may limit the demagnetizing procedure. Therefore, it is desirable that coercive force is smaller. The coercive force is preferably 5.5 Oe or smaller and more preferably not more than 3.0 Oe.

A manufacturing method of the magnetic shielding steel sheet of the first embodiment will be described below.

First, the steel having above-mentioned chemical composition is smelted, continuously cast, and then hot-rolled in known manners. The continuously-cast slab may be hot-rolled directly or after re-heated. Alternatively, the continuously-cast slab may be hot-rolled after cooled and then re-heated. The hot-rolled steel is then pickled in known manner, cold-rolled , and annealed for recrystallization. Thereafter, if necessary, the steel sheet may be skin-pass rolled. For ensuring the anhysteretic magnetic properties, the skin-pass reduction should be as small as possible, preferably 1.5% or less. When the shape and the aging property of the steel sheet is not crucial, the skin-pass rolling reduction is preferably not more than 0.5%. More preferably, skin-pass rolling may not be applied.

Also, decarburization annealing may be provided during the above-mentioned procedure. The annealing may serve both as decarburization annealing and recrystallization annealing after the cold-rolling. Finally, the steel sheet is coated with the Cr plating layer and/or the Ni plating layer if necessary.

A second embodiment of the present invention will now be described.

A steel sheet according to the second embodiment of he present invention essentially consists of 0.005%0.025% by weight of C, 0.3% by weight or less of Si, 1.5% by weight or less of Mn, 0.05% by weight or less of P, 0.04% by weight or less of S, 0.1% by weight or less of sol.Al, 0.01% by weight or less of N, 0.0003–0.01% by weight of, and the balance of Fe. The steel sheet has a thickness ranging 0.05–0.5 mm, the coercive force of less than 3.0 Oe, and the anhysteretic magnetic permeability of 8500 or higher. Also, its surface(s) may preferably be coated with a Cr plating layer and/or an Ni plating layer.

The composition, thickness, coercive force, anhysteretic magnetic permeability, and plating of the steel sheet are explained below in more detail.

1. Chemical Composition of the Steel Sheet

C: C is an element the content of which is most important in this invention. It is generally said that C is a harmful element for the magnetic shielding steel sheet, because the precipitation of Fe3C leads to the decrease in $\mu$0.35. It is, however, found from our studies that the presence of Fe3C declines the magnetic permeability at a low magnetic field but increases the anhysteretic magnetic permeability. It is hence unnecessary to restrict the carbon content to very small amount (for example, not more than 0.0030% by weight) as in the prior arts. The lower limit of C content is 0.005% by weight in order to ensure the existence of Fe3C. However, if the amount of C is too high, the coercive force may increase and limit the conditions of demagnetization for ensuring the anhysteretic magnetic permeability. For this reason, C content is limited to less than 0.025% by weight in this embodiment of the present invention, in order to make the coercive force at less than 3.0 Oe.

Si: Si tends to be concentrated at the surface of the steel sheet during the annealing process, resulting in unfavorable deterioration in the adhesion property of the plating layer. Thus Si content is hence limited to less than 0.3% by weight in this embodiment of the present invention.

Mn: Mn is effective for increasing the strength of the steel sheet, resulting in improvement of handling property. If the amount is excessively high, the cost will increase. Mn content is limited to 1.5% by weight or less in this embodiment of the present invention.

P: P is effective for increasing the strength of the steel. If the amount of P is too high, its segregation may result in cracking during the production of the steel sheet. The amount is hence limited to 0.05% by weight or less in this embodiment of the present invention.

S: S content is preferably as small as possible for keeping the vacuum well in the cathode ray tube. The amount of S is limited to 0.04% by weight or less in this embodiment of the present invention.

Sol.Al: Al is an essential element for deoxidization reaction in the steelmaking process. If its amount is too high, inclusions may increase. The amount of Sol.Al is thus limited to 0.1% by weight or less in this embodiment of the present invention.

N: If the amount of N is excessively high, it may cause surface defects of the steel sheet. Thus, the amount of N is limited to 0.01% by weight or less in this embodiment of the present invention.

B: B is an important element for increasing the anhysteretic magnetic permeability. If the amount of B is less than 0.0003% by weight, its effect may be little. If the amount exceeds 0.01% by weight, the increase of the anhysteretic magnetic permeability may be saturated while the recrystallization temperature may rise up and the hardness of the steel may sharply be increased. Hence, the amount of B is limited to 0.0003–0.01% by weight in this embodiment of the present invention.

2. Thickness

From the same reason as of the first embodiment, the thickness of the steel sheet of this embodiment is limited to 0.05–0.5 mm.

3. Coercive Force

If the coercive force is excessively large, it is necessary to increase the demagnetizing current and the demagnetizing amplitude for ensuring the magnetic shielding effect, which may limit the demagnetizing procedure. Therefore, it is desirable that coercive force is smaller. In this embodiment of the present invention, the coercive force is limited to less than 3.0 Oe.

4. Anhysteretic Magnetic Permeability

The anhysteretic magnetic permeability of the magnetic shield material is an effective parameter which is strongly related to the color deviation on a color cathode ray tube. The magnetic shield material having the anhysteretic magnetic permeability of 8500 or higher can more effectively reduce the color deviation to a level which is hardly noticeable in practice, even for a color cathode ray tube of large screen size or high-definition type. Accordingly, the anhysteretic magnetic permeability is limited to 8500 or higher in this embodiment of the present invention.

5. Plating

Similar to the first embodiment, the Cr plating layer and/or the Ni plating layer is desirably provided for anti corrosion property. The plating layer structure may be a single layer or a multi-layer structure. The plating may be provided on either one side or both sides of the steel sheet. The plating layer is effective not only for anticorrosion property but also for preventing the generation of degassing in the steel sheet of the cathode ray tube. The total amount of the plating layer is not necessary to be limited and may arbitrarily be determined so that it can cover all over the surface(s) of the steel sheet. Also, the plating may be implemented by partially plating with Ni and then finishing with chromate treatment.

A manufacturing method of the magnetic shielding steel sheet of the second embodiment will be described below.

First, the steel having above-mentioned chemical composition is smelted, continuously cast, and hot-rolled in known manners. The continuously-cast slab may be hot-rolled directly or after re-heating. Alternatively, the continuously-cast slab may be hot-rolled after cooled and re-heated. The re-heating temperature preferably ranges 1050–1300° C. If the temperature is lower than 1050° C., it is difficult to ensure the finishing temperature at the hot-rolling above the $Ar_3$ transformation temperature. If the temperature exceeds 1300° C., oxides generated on the slab surface may unfavorably be increased. For making the grain size of the hot-rolled steel sheet uniform, the finishing temperature is limited above the $Ar_3$ transformation temperature. Also, the coiling temperature is preferably 700° C. or lower. If the coiling temperature exceeds 700° C., film-like $Fe_3C$ may precipitate along grain boundaries of the hot-rolled steel sheet, hence deteriorating the uniformity.

The hot-rolled steel sheet is then pickled and then cold-rolled at a reduction of 70–94%. If the reduction is lower than 70%, the grain size of the annealed steel sheet become too large, causing the steel sheet to be unfavorably softened. If the reduction exceeds 94%, the anhysteretic magnetic permeability may be declined. Preferably, the reduction is 90% or less.

The cold-rolled steel sheet is continuously annealed (as recrystallization annealing) at a temperature of 600–780° C. If the annealing temperature is lower than 600° C., the recrystallization may not perfectly be completed and deformation strain due to cold-rolling may remain. If the annealing temperature exceeds 780° C., the anhysteretic magnetic permeability may undesirably be declined.

After the annealing, the steel sheet may be skin-pass rolled if necessary. For ensuring the anhysteretic magnetic properties, the deformation strain due to cold-rolling is preferably as small as possible. Most preferably, skin-pass rolling is not carried out. However, when the skin-pass rolling is inevitable for correcting the shape of the sheet, the reduction should be as low as possible minimized. The maximum of skin-pass reduction may preferably be 1.5%. In case that the shape and the aging of the steel sheet are not so crucial, the skin-pass rolling reduction is more preferably kept at 0.5% or lower.

Finally, the steel sheet is coated with the Cr plating layer and/or the Ni plating layer if necessary.

EXAMPLES

1. Example 1

Examples of the first embodiment are explained.

Steels A to G listed in Table 1 were smelted, hot-rolled to a thickness of 1.8 mm, pickled, and then cold-rolled at a reduction of 83–94% to produce steel sheets having thickness of 0.1–0.3 mm. Then, they were annealed for recrystallization at temperature above the recrystallization temperature and below the transformation temperature. The annealed steel sheets were Cr-plated on both surfaces, directly after annealing or after skin-pass rolled 0.5–2.0% following the annealing precess. Thus, test pieces were obtained.

The Cr-plating consisted of a metallic Cr layer of 95–120 mg/m2 at the bottom and a Cr-oxide layer of 12–20 mg/cm2 (converted into metallic Cr) at the top.

TABLE 1

| | Chemical composition (wt %) | | | | | | | | | | |
|---|---|---|---|---|---|---|---|---|---|---|---|
| | C | Si | Mn | P | S | Sol. Al | N | Cr | B | Nb | Ti |
| Steel A | 0.0022 | 0.01 | 0.14 | 0.008 | 0.008 | 0.008 | 0.0024 | 0.030 | Tr. | 0.026 | Tr. |
| Steel B | 0.0018 | 0.01 | 0.32 | 0.016 | 0.013 | 0.013 | 0.0026 | 0.029 | 0.0011 | Tr. | Tr. |
| Steel C | 0.0019 | 0.01 | 0.95 | 0.074 | 0.006 | 0.006 | 0.0018 | 0.041 | 0.0005 | Tr. | 0.048 |
| Steel D | 0.020 | 0.02 | 0.21 | 0.009 | 0.008 | 0.008 | 0.0028 | 0.033 | Tr. | Tr. | Tr. |
| Steel E | 0.022 | 0.01 | 0.23 | 0.010 | 0.007 | 0.007 | 0.0020 | 0.034 | 0.0015 | Tr. | Tr. |
| Steel F | 0.042 | 0.01 | 0.25 | 0.014 | 0.012 | 0.012 | 0.0043 | 0.046 | Tr. | Tr. | Tr. |
| Steel G | 0.162 | 0.02 | 0.68 | 0.011 | 0.008 | 0.008 | 0.0029 | 0.035 | Tr. | Tr. | Tr. |

The magnetic permeability ($\mu$0.35), the remanent flux density, the coercive force, and the anhysteretic magnetic permeability of the samples prepared as mentioned above were examined. The examination for each condition was carried out using ring-shaped specimens wound with a magnetization coil, a search coil, and an additional coil for applying DC bias magnetic field. Measurement of the anhysteretic magnetic permeability, the magnetic permeability ($\mu$0.35) at 0.35 Oe, and the coercive force and the remanent flux density for the maximum applied magnetic field of 50 Oe were carried out.

The anhysteretic magnetic permeability was measured by the following steps.

1) Attenuating alternating current was supplied to the magnetization coil, to demagnetize the specimens perfectly.

2) DC current was supplied to the additional coil for DC bias field to generate a DC bias magnetic field of 0.35 Oe and then, the attenuating alternating current was supplied to the magnetization coil, to simulate the degaussing process for the specimens.

3) the magnetization coil was supplied with a current to magnetize the specimen and the remanent magnetic flux generated was detected with the search coil, to obtain a B–H curves.

4) the anhysteretic magnetic permeability was determined from the B–H curve.

The magnetic properties are shown in Table 2 in combination with the type of steel, the thickness, and the skin-pass rolling reduction.

TABLE 2

| No. | Steel | Thickness (mm) | Skin-pass rolling reduction (%) | Anhysteretic magnetic permeability | Magnetic permeability $\mu$0.35 | Remanent flux density (kG) | Coercive force (Oe) |
|---|---|---|---|---|---|---|---|
| 1 | A | 0.3 | 2.0 | 5200 | 200 | 8.7 | 3.2 |
| 2 | A | 0.3 | 0.5 | 8900 | 290 | 11.3 | 2.9 |
| 3 | A | 0.3 | 0.0 | 15600 | 300 | 13.7 | 2.5 |
| 4 | B | 0.3 | 2.0 | 7100 | 210 | 9.6 | 2.9 |
| 5 | B | 0.3 | 1.5 | 8000 | 220 | 10.0 | 2.8 |
| 6 | B | 0.3 | 0.0 | 17000 | 230 | 13.9 | 2.2 |
| 7 | C | 0.2 | 0.0 | 9300 | 460 | 8.2 | 1.8 |
| 8 | D | 0.2 | 0.0 | 15500 | 270 | 9.9 | 3.0 |
| 9 | E | 0.2 | 0.0 | 16500 | 300 | 14.6 | 2.6 |
| 10 | F | 0.1 | 0.5 | 16900 | 270 | 12.3 | 3.8 |
| 11 | G | 0.1 | 0.0 | 13700 | 150 | 8.6 | 5.6 |

As shown in Table 2, Nos. 2, 3, and 5 to 10, prepared according to the first embodiment of the present invention, exhibited the anhysteretic magnetic permeability of above 7500 and the coercive force of below 5.5 Oe, thus providing a significant level of the magnetic shielding effect after the degaussing process.

On the other hand, No. 1 and No. 4 having skin-pass reductions of higher than 1.5% exhibited the anhysteretic magnetic permeability of less than 7500, hence providing a poor level of the magnetic shielding effect. Also, No. 11 containing C of more than 0.15% by weight exhibited large coercive force, and thus deteriorating the demagnetizing properties.

2. Example 2

Examples of the second embodiment are now explained.

Steels H to K listed in Table 3 were smelted. Thereafter, for Steels H and I, hot-rolling were at the finishing temperature of 890° C. and at the coiling temperature of 620° C.; for Steels J and K, the finishing temperature and the coiling temperature was 870° C. and 620° C., respectively. Then, hot-rolled steel sheets were pickled and then cold-rolled at the reduction of 75–94% to obtain steel sheets having thickness of 0.1–0.5 mm. The cold-rolled steel sheets were then annealed for recrystallization at 630–850° C. and, thereafter, some of the annealed sheets were skin-pass rolled at reduction of 0.5–1.5% and some were not skin-pass rolled, then all of these were Cr-plated on both sides of the sheets. Thus, test pieces were obtained.

The Cr-plating consisted of a metallic Cr layer of 95–120 mg/m2 at the bottom and a Cr-oxide layer of 12–20 mg/cm2 (converted into metallic Cr) at the top.

TABLE 3

| | Chemical composition (wt %) | | | | | | | | |
|---|---|---|---|---|---|---|---|---|---|
| | C | Si | Mn | P | S | Sol. Al | N | B | Nb |
| Steel H | 0.0022 | 0.01 | 0.14 | 0.008 | 0.008 | 0.038 | 0.0024 | Tr. | 0.026 |
| Steel I | 0.0056 | 0.02 | 0.27 | 0.010 | 0.011 | 0.040 | 0.0025 | 0.0018 | Tr. |
| Steel J | 0.022 | 0.01 | 0.23 | 0.010 | 0.007 | 0.035 | 0.0020 | 0.0025 | Tr. |
| Steel K | 0.042 | 0.01 | 0.25 | 0.014 | 0.012 | 0.041 | 0.0043 | 0.0015 | Tr. |

The magnetic permeability ($\mu$0.35), the remanent flux density, the coercive force, and the anhysteretic magnetic permeability of the samples prepared as mentioned above were examined. The examination for each condition was carried out using ring-shaped specimens wound with a magnetization coil, a search coil, and an additional coil foe applying DC bias magnetic field. Measurement of the anhysteretic magnetic permeability, the magnetic permeability ($\mu$0.35) at 0.35 Oe, and the coercive force and the remanent flux density for the maximum applied magnetic field of 10 Oe were carried out.

The anhysteretic magnetic permeability was measured in the same procedure as of Example 1.

The magnetic properties are shown in Table 4 in combination with the type of steel, the thickness, the cold-rolling reduction, the annealing temperature, and the skin-pass rolling reduction.

TABLE 4

| No. | Steel | Thickness (mm) | Cold-rolling reduction (%) | Annealing temperature (° C.) | Skin-pass rolling reduction (%) | Anhysteretic magnetic permeability | Magnetic permeability $\mu$0.35 | Remanent flux density (kG) | Coercive force (Oe) |
|---|---|---|---|---|---|---|---|---|---|
| 21 | H | 0.30 | 87 | 750 | 1.0 | 8000 | 250 | 10.2 | 2.9 |
| 22 | I | 0.30 | 85 | 680 | — | 13500 | 270 | 13.6 | 2.5 |
| 23 | I | 0.15 | 92 | 680 | — | 12900 | 260 | 13.4 | 2.6 |
| 24 | J | 0.50 | 75 | 700 | — | 18000 | 300 | 14.0 | 2.6 |
| 25 | J | 0.30 | 85 | 700 | — | 15300 | 290 | 13.9 | 2.7 |
| 26 | J | 0.15 | 92 | 700 | — | 14300 | 280 | 13.7 | 2.7 |
| 27 | J | 0.10 | 94 | 700 | — | 13200 | 280 | 13.6 | 2.8 |
| 28 | J | 0.30 | 85 | 630 | 0.5 | 8600 | 240 | 10.1 | 2.8 |
| 29 | J | 0.30 | 85 | 750 | 0.5 | 8500 | 250 | 9.8 | 2.9 |
| 30 | J | 0.30 | 85 | 850 | 0.5 | 5700 | 340 | 7.6 | 3.0 |
| 31 | J | 0.30 | 85 | 630 | — | 15700 | 350 | 13.5 | 2.6 |
| 32 | k | 0.30 | 85 | 630 | — | 14000 | 300 | 14.8 | 3.8 |

As shown in Table 4, Nos. 22 to 29 and No. 31 prepared according to the second embodiment of the present invention exhibited the anhysteretic magnetic permeability of abone 8500 and the coercive force of below 3.0 Oe, thus providing a significant level of the magnetic shielding effect after the degaussing process.

On the other hand, No. 30 annealed at a temperature higher than that mentioned in the second embodiment exhibited inferior anhysteretic magnetic permeability, hence providing a poor level of the magnetic shielding effect. Besides, the coercive force of No. 30 exceeded 3.0 Oe and the demagnetizing properties were deteriorated. No. 21, C content of which was less than 0.005% by weight, exhibited the anhysteretic magnetic permeability of above 7500 but below 8500 and its magnetic shielding effect hence failed to reach the level of the second embodiment. No. 32, C content of which was more than 0.025% by weight, exhibited a larger coercive force than that mentioned in the second embodiment, hence providing inferior demagnetizing properties.

As set forth above, the present invention allows the chemical composition and manufacturing condition of steel sheets to be optimized, to have a higher anhysteretic magnetic permeability and also an improved coercive force, hence ensuring superior magnetic shielding effect after the degaussing process.

The steel sheet of the present invention, when used as magnetic shields in a color cathode ray tube, enables to provide an improved the magnetic shielding effect after degaussing process, and thus successfully reduce the color deviation caused by geomagnetic drift. Accordingly, the steel sheet for magnetic shields can be provided for yielding high definition images.

What is claimed is:

1. A steel sheet for magnetic shields containing 0.005 to 0.15% by weight of C and having a thickness of 0.05 to 0.5 mm and an anhysteretic magnetic permeability of 7500 or more.

2. A steel sheet according to claim 1, further containing 0.0003–0.01% by weight of B.

3. A steel sheet according to claim 1, further containing one or more elements selected from a group of Ti, Nb, and V, the total amount of which is 0.08% by weight or less.

4. A steel sheet according to claim 1, wherein its surface is coated with Cr plating layer and/or Ni plating layer.

5. A steel sheet according to claim 1, wherein a coercive force is 5.5 Oe or less.

6. A steel sheet for magnetic shields consisting essentially of 0.005–0.025% by weight of C, less than 0.3% by weight of Si, 1.5% by weight or less of Mn, 0.05% by weight or less of P, 0.04%. by weight or less of S, 0.1% by weight or less of Sol.Al, 0.01% by weight or less of N, 0.0003–0.01% by weight of B, and the balance of Fe, wherein the thickness ranges 0.05–0.5 mm, the coercive force is less than 3.0 Oe, and an anhysteresis magnetic permeability is 8500 or higher.

7. A steel sheet according to claim 6, wherein its surface is coated with a Cr plating layer and/or an Ni plating layer.

8. A steel sheet according to claim 2, further containing one or more elements selected from a group of Ti, Nb, and V, the total amount of which is 0.08% by weight or less.

9. A steel sheet according to claim 2, wherein its surface is coated with Cr plating layer and/or Ni plating layer.

10. A steel sheet according to claim 3, wherein its surface is coated with Cr plating layer and/or Ni plating layer.

11. A steel sheet according to claim 2, wherein a coercive force is 5.5 Oe or less.

12. A steel sheet according to claim 3, wherein a coercive force is 5.5 Oe or less.

13. A steel sheet according to claim 4, wherein a coercive force is 5.5 Oe or less.

14. A steel sheet according to claim 8, wherein its surface is coated with Cr plating layer and/or Ni plating layer.

15. A steel sheet according to claim 8, wherein a coercive force is 5.5 Oe or less.

16. A steel sheet according to claim 9, wherein a coercive force is 5.5 Oe or less.

17. A steel sheet according to claim 10, wherein a coercive force is 5.5 Oe or less.

18. A steel sheet according to claim 14, wherein a coercive force is 5.5 Oe or less.

19. A method of producing a magnetic shielding steel sheet of claim 1 comprising the steps of:

(a) hot-rolling a steel slab containing 0.005 to 0.15% by weight of C to form a hot-rolled steel sheet;

(b) cold-rolling the hot-rolled steel sheet from step (a);

(c) annealing the resultant cold-rolled steel sheet from step (b); and (d) optionally skin-pass rolling the steel sheet from step ca) at a reduction of 1.5% or less.

20. A method according to claim 19, wherein the steel slab further contains 0.0003–0.01% by weight of B.

21. A method according to claim 19, wherein the steel slab further contains one or more elements selected from the group consisting of Ti, Nb, and V, the total amount of which is 0.08% by weight or less.

22. A method according to claim 19, further comprising the step of coating the surface of the steel sheet with a Cr plating layer and/or an Ni plating layer.

23. A method according to claim 20, wherein the steel slab further contains one or more elements selected from the group consisting of Ti, Nb, and V, the total amount of which it is 0.08% by weight or less.

24. A method according to claim 23, further comprising the step of coating the surface of the steel sheet with a Cr plating layer and/or an Ni plating layer.

25. A method according to claim 20, further comprising the step of coating the surface of the steel sheet with a Cr plating layer and/or an Ni plating layer.

26. A method according to claim 21, further comprising the step of coating the surface of the steel sheet with a Cr plating layer and/or an Ni plating layer.

27. A method of producing a magnetic shielding steel sheet of claim 6 comprising the steps of:

(a) hot-rolling a steel slab to form a steel sheet, the steel sheet containing 0.005–0.025% by weight of C, less 0.3% by weight of Si, 1.5% by weight or less of Mn, 0.05% by weight or less of P, 0.04% by weight or less of S, 0.1% by weight or less of Sol.Al, 0.01% by weight or less of N, 0.0003–0.01% by weight of B, directly or after a re-heating process, at a finishing temperature higher than the transformation temperature of Ar3;

(b) coiling the resultant hot-rolled steel sheet from step (a) at a temperature of 700° C. or lower;

(c) pickling the resultant coiled hot-rolled steel sheet from step (b);

(d) cold-rolling the resultant pickled hot-rolled steel sheet from step (c) at a reduction of 70 to 94%; and (e) continuously annealing the resultant cold-rolled steel sheet from step (d) at a temperature of 600 to 780° C.

28. A method according to claim 27, further comprising the step of coating the surface of the steel sheet with a Cr plating layer and/or an Ni plating layer.

* * * * *